(12) United States Patent
Klassen (10) Patent No.: US 8,203,768 B2
(45) Date of Patent: Jun. 19, 2012

(54) METHOD AND SYSTEM FOR PROCESSING SCANNED PATCHES FOR USE IN IMAGING DEVICE CALIBRATION

(75) Inventor: R. Victor Klassen, Webster, NY (US)

(73) Assignee: Xerox Corporaiton, Norwalk, CT (US)

( * ) Notice: Subject to any disclaimer, the term of this patent is extended or adjusted under 35 U.S.C. 154(b) by 726 days.

(21) Appl. No.: 11/170,975

(22) Filed: Jun. 30, 2005

(65) Prior Publication Data

US 2007/0002403 A1    Jan. 4, 2007

(51) Int. Cl.
*H04N 1/46* (2006.01)
*H04N 1/60* (2006.01)

(52) U.S. Cl. ........ 358/504; 358/518; 358/521; 358/523; 358/1.9; 382/165; 382/167; 382/275

(58) Field of Classification Search .................... 358/1.9, 358/504, 521, 3.26, 520, 535, 518, 3.23; 382/165, 167, 275
See application file for complete search history.

(56) References Cited

U.S. PATENT DOCUMENTS

| | | | |
|---|---|---|---|
| 4,473,298 A | 9/1984 | Sakamoto | |
| 4,516,175 A | 5/1985 | Jung et al. | |
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,375,197 A | 12/1994 | Kang | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,546,165 A * | 8/1996 | Rushing et al. ................ | 399/78 |
| 5,557,367 A | 9/1996 | Yang et al. | |
| 5,568,246 A | 10/1996 | Keller et al. | |

(Continued)

FOREIGN PATENT DOCUMENTS

JP    04-296163    10/1992

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner* — King Poon
*Assistant Examiner* — Lawrence Wills
(74) *Attorney, Agent, or Firm* — Fay Sharpe LLP (57) ABSTRACT

The presently described embodiments provide for halftone-aligned averaging and noise reduction in a calibration method and associated system. Halftone-aligned averaging is implemented, in one form, as a method of averaging in which the window over which an average is computed is a multiple of the halftone period. Noise reduction, in one illustrative embodiment, comprises discarding windows having an average outside of the range from the $5^{th}$ to the $95^{th}$ percentiles of all windows for a patch.

32 Claims, 6 Drawing Sheets

U.S. PATENT DOCUMENTS

| | | | |
|---|---|---|---|
| 5,570,172 | A | 10/1996 | Acquaviva |
| 5,596,416 | A | 1/1997 | Barry et al. |
| 5,629,762 | A | 5/1997 | Mahoney et al. |
| 5,710,968 | A | 1/1998 | Clark et al. |
| 5,748,330 | A | 5/1998 | Wang et al. |
| 5,778,377 | A | 7/1998 | Marlin et al. |
| 5,784,667 | A | 7/1998 | Mestha et al. |
| 5,790,281 | A | 8/1998 | Knox et al. |
| 5,884,910 | A | 3/1999 | Mandel |
| 5,995,721 | A | 11/1999 | Rourke et al. |
| 6,059,284 | A | 5/2000 | Wolf et al. |
| 6,125,248 | A | 9/2000 | Moser |
| 6,141,120 | A * | 10/2000 | Falk ........................ 358/504 |
| 6,232,953 | B1 * | 5/2001 | Graham et al. ............. 345/596 |
| 6,241,242 | B1 | 6/2001 | Munro |
| 6,297,886 | B1 | 10/2001 | Cornell |
| 6,341,773 | B1 | 1/2002 | Aprato et al. |
| 6,345,117 | B2 | 2/2002 | Klassen |
| 6,381,037 | B1 | 4/2002 | Balasubramanian et al. |
| 6,384,918 | B1 | 5/2002 | Hubble, III et al. |
| 6,441,923 | B1 | 8/2002 | Balasubramanian et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,760,056 | B2 | 7/2004 | Klassen et al. |
| 6,775,029 | B1 | 8/2004 | Wen et al. |
| 6,819,906 | B1 | 11/2004 | Herrmann et al. |
| 6,925,283 | B1 | 8/2005 | Mandel et al. |
| 6,959,165 | B2 | 10/2005 | Mandel et al. |
| 2001/0033686 | A1 | 10/2001 | Klassen |
| 2002/0067849 | A1 | 6/2002 | Klassen et al. |
| 2002/0078012 | A1 | 6/2002 | Ryan et al. |
| 2002/0103559 | A1 | 8/2002 | Gartstein |
| 2003/0063302 | A1 | 4/2003 | Munger et al. |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0136015 | A1 | 7/2004 | Van de Capelle et al. |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0165199 | A1 | 8/2004 | Klassen et al. |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0246528 | A1 | 12/2004 | Washio et al. |
| 2004/0247365 | A1 | 12/2004 | Lofthus et al. |
| 2004/0252905 | A1 | 12/2004 | Mizes et al. |
| 2004/0257595 | A1 | 12/2004 | Sharma et al. |
| 2004/0264768 | A1 | 12/2004 | Sharma et al. |
| 2004/0264769 | A1 | 12/2004 | Sharma et al. |
| 2004/0264770 | A1 | 12/2004 | Sharma et al. |
| 2004/0264771 | A1 | 12/2004 | Sharma et al. |
| 2005/0036159 | A1 | 2/2005 | Sharma et al. |

FOREIGN PATENT DOCUMENTS

JP      05-091320      4/1993

OTHER PUBLICATIONS

Desmond Fretz, "Cluster Printing Solution Announced", Today at Xerox (TAX), No. 1129, Aug. 3, 2001.
U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.
U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus, et al.
U.S. Appl. No. 11/137,251, filed May 25, 2005, Lofthus, et al.
U.S. Appl. No. 11/137,273, filed May 25, 2005, Anderson, et al.
Keith Knox, "Integrating Cavity Effect in Scanners," Proceedings on IS&T/OSA Conference on Optics and Imaging in the Information Age, Rochester, pp. 156-158 (1996).
G. Sharma, S. Wang, D. Sidavanahalli and K. Knox, "The Impact of UCR on Scanner Calibration," in Proc PICS Conf., pp. 121-124, Portland, OR (1998).
V. Ostromoukhov, R.D. Hersch, C. Peraire, P. Emmel and I. Amidror, "Two Approaches in Scanner-Printer Calibration: Colorimetric Space-Based vs. Closed-Loop," in Proc SPIE 2170, pp. 133-142 (1994).
U.S. Appl. No. 10/945,600, filed Sep. 20, 2004, Yao.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/212,367, filed Aug. 26, 2005, Anderson et al.
U.S. Appl. No. 11/215,791, filed Aug. 30, 2005, Hamby et al.
U.S. Appl. No. 11/222,260, filed Sep. 8, 2005, Goodman et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/235,979, filed Sep. 27, 2005, Anderson et al.
J. Hardeberg, "Desktop Scanning to sRGB," in IS&T and SPIE's Device Independent Color, Color Hardcopy and Graphic Arts V, San Jose, CA (Jan. 2000).

H. Haneishi, T. Hirao, A. Shimazu and Y. Miyake, "Colorimetric Precision in Scanner Calibration Using Matrices," in Proceedings of IS&T and SID'S 3$^{rd}$ Color Imaging Conference: Color Science, Systems and Applications, pp. 106-108, Scottsdale, Arizona (Nov. 1995).

A.R. Rao, "Color Calibration of a Colorimetric Scanner Using Non-Linear Least Squares," in Proc. IS&T's 1998 PICS Conference, Portland, OR (May 1998).

U.S. Appl. No. 11/236,099, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/268,294, filed Nov. 4, 2005, Klassen.
U.S. Appl. No. 11/274,638, filed Nov. 15, 2005, Wu et al.
U.S. Appl. No. 11/287,177, filed Nov. 23, 2005, Mandel et al.
U.S. Appl. No. 11/291,860, filed Nov. 30, 2005, Willis.
U.S. Appl. No. 11/292,163, filed Nov. 30, 2005, Mandel et al.
U.S. Appl. No. 11/292,388, filed Nov. 30, 2005, Mueller.
U.S. Appl. No. 11/314,774, filed Dec. 21, 2005, Klassen.
U.S. Appl. No. 11/315,045, filed Dec. 22, 2005, Klassen.
U.S. Appl. No. 11/593,410, filed Nov. 6, 2006, Klassen.

J. Hardeberg, "Acquisition and Reproduction of Colour Images: Colorimetric and Multispectral Approaches," Doctoral Dissertation, l'Ecole Nationale Superieure des Telecommunications, Paris (1999).

U.S. Appl. No. 11/170,873, filed Jun. 30, 2005, Klassen.

Pappas T. N. et al., "Measurement of Printer Parameters for Model-Bases Halftoning," Journal of Electronic Imaging, SPIE / IS & T. US, vol. 2, No. 3, Jul. 1, 1993, pp. 193-204, XP000394878, ISSN: 1017-9909.

European Search Report.

"The Art of Computer Programming," Third Edition, vol. 2 / Seminumerical Algorithms, 4.2.2, pp. 229-245, 1998.

* cited by examiner

METHOD AND SYSTEM FOR PROCESSING SCANNED PATCHES FOR USE IN IMAGING DEVICE CALIBRATION

CROSS REFERENCE TO RELATED PATENTS AND APPLICATIONS

This application is related to U.S. application Ser. No. 10/372,558, filed Feb. 23, 2003 and having a Publication No. U.S. 2004/0165199 A1.

The following applications, the disclosures of each being totally incorporated herein by reference are mentioned:

U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," by David G. Anderson et al.;

U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE," by David G. Anderson et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/000,168, filed Nov. 30, 2004, entitled "ADDRESSABLE FUSING AND HEATING METHODS AND APPARATUS," by David K. Biegelsen, et al.;

U.S. application Ser. No. 11/001,890, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/002,528, filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/070,681, filed Mar. 2,2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18,2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst-etal.;

U.S. application Ser. No. 11/109,996, filed Apr. 20, 2005, entitled "PRINTING SYSTEMS," by Michael C. Mongeon et al.;

U.S. application Ser. No. 11/115,766, Filed Apr. 27, 2005, entitled "IMAGE QUALITY ADJUSTMENT METHOD AND SYSTEM," by Robert E. Grace;

U.S. application Ser. No. 11/143,818, filed Jun. 2, 2005, entitled "INTER-SEPARATION DECORRELATOR", by Edul N. Dalal et al.;

U.S. application Ser. No. 11/146,665, filed Jun. 7, 2005, entitled "LOW COST ADJUSTMENT METHOD FOR PRINTING SYSTEMS", by Michael C. Mongeon; and, U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER", by R. Victor Klassen.

INCORPORATION BY REFERENCE

U.S. application Ser. No. 10/372,558, filed Feb. 23, 2003 and having Publication No. U.S. 2004/0165199 A1 is hereby incorporated herein, in its entirety, by reference.

BACKGROUND

An imaging device, such as a printer or copier, typically creates images using combinations of four colors of marking agents or colorants, such as cyan, magenta, yellow and black (CMYK). The images are created based on image data which assigns at least one of the four colors and a numerical color intensity or input color value to each picture element or pixel in the image.

A problem is that, due to manufacturing variations, environmental conditions and usage histories, different imaging devices can output different intensities of color based on identical image data. The density of the toner laid down on the print medium determines the color intensity. The denser or thicker the toner is laid down on a white print medium such as paper, the less white is visible through the toner on the paper. Consequently, the denser the toner, the less the lightness of the toner color, and the greater the intensity of the toner color.

Because there is such variation in toner density laid down by different imaging devices based on identical image data, color intensities that are output by some imaging devices can be outside of an acceptable range. Thus, in order to ensure that each imaging device outputs color intensities that closely correspond to the color intensities specified by the image data, each imaging device should be individually calibrated to output appropriate color intensities.

Traditionally, calibrating printers (e.g. any apparatus, such as a digital copier, bookmaking machine, facsimile machine, multi-function machine, etc. which performs a print outputting function for any purpose) has proven to be a less-than-efficient task, particularly if large amounts of data (e.g. test patches) are used. Recently, scanners have been contemplated as an efficient mechanism to aid in the calibration process. Traditional printer calibration (that is, not using a scanner) typically has employed a densitometer or spectrophotometer, which includes an aperture typically around 5 mm in diameter, the reflected light that passes through that aperture is optically averaged by the device. Scanner based printer calibration has traditionally involved averaging the area in some region analogous to the aperture of a spectrophotometer or densitometer.

Scanner-based printer calibration requires scanning portions of printed pages, applying some image processing technique to obtain averages over small regions of the page, in analogy to the spectrophotometer aperture, and then converting the averaged signal to a device independent color space. To do this conversion, the scanner must itself be characterized. Calibration is a process that obtains the change required to the device signals required to restore the device behavior to its nominal state; characterization is a process that obtains the conversion from device signals to device independent signals in some standardized color space.

Scanner characterization and scanner-based printer calibration usually involve scanning patches and then averaging the pixels in the central portion of the patch. Averaging reduces noise and emulates the effect of the spectrophotometer aperture; using only the central portion avoids any stray colorant from adjacent patches, as well as providing some protection against misregistration errors (that is, failure to locate the exact boundaries of the patch). However, it is possible to do better than emulating the averaging performed by a spectrophotometer with a fixed aperture, when processing a scanned image of printed patches. Using the methods of the presently described embodiments, smaller patches may be averaged, with greater precision (less noise) in the averages.

BRIEF DESCRIPTION

The presently described embodiments provide for halftone-aligned averaging and noise reduction in a calibration method and associated system. Halftone-aligned averaging is implemented, in one form, as a method of averaging in which the window over which an average is computed is a multiple of the halftone period. Noise reduction, in one illustrative embodiment, comprises discarding windows having an average outside of the range from the $5^{th}$ to the $95^{th}$ percentiles of all windows for a patch.

In one aspect of the presently described embodiments, a calibration method for a printer comprises printing at least one test patch comprising a plurality of halftone cells having a halftone period, scanning the test patch to obtain predetermined values for each halftone cell, calculating subset averages of the values of subsets of the halftone cells, the subsets being defined by an averaging window sized to be a multiple of the halftone period, calculating an overall average of the subset averages for the test patch and calibrating the printer based on the overall average.

In another aspect of the presently described embodiments, the method further comprises discarding subset averages outside a predetermined range before calculating the overall average.

In another aspect of the presently described embodiments, the range is from the fifth ($5^{th}$) to the ninety-fifth ($95^{th}$) percentile of all subset averages.

In another aspect of the presently described embodiments, the plurality of halftone cells are disposed in two directions.

In another aspect of the presently described embodiments, the calculating of subset averages is conducted in the two directions.

In another aspect of the presently described embodiments, the test patch includes multiple separations.

In another aspect of the presently described embodiments, the calculating subset averages, calculating the overall average and calibrating is conducted for each of the multiple separations.

In another aspect of the presently described embodiments, the at least one test patch comprises a test pattern.

In another aspect of the presently described embodiments, a system comprises a printing device operative to print at least one test patch comprising a plurality of halftone cells having a halftone period, a scanning device operative to scan the test patch to obtain predetermined values for each halftone cell and a processor operative to calculate subset averages of the values of subsets of the halftone cells, the subsets being defined by an average window sized to be a multiple of the halftone period, calculate an overall average of the subset averages for the test patch and calibrate based on the overall average.

In another aspect of the presently described embodiments, the processor is further operative to discard subset averages outside a predetermined range before calculating the overall average.

In another aspect of the presently described embodiments, the range is from the fifth ($5^{th}$) to the ninety-fifth ($95^{th}$) percentile of all subset averages period the plurality of halftone cells are disposed in two directions.

In another aspect of the presently described embodiments, the plurality of halftone cells are disposed in two directions.

In another aspect of the presently described embodiments, the processor is further operative to calculate subset averages in the two directions.

In another aspect of the presently described embodiments, the test patch includes multiple separations.

In another aspect of the presently described embodiments, the processor is operative to calculate subset averages, calculate the overall average and calibrate for each of the multiple separations.

In another aspect of the presently described embodiments, the at least one test patch comprises a test pattern.

In another aspect of the presently described embodiments, a calibration method for an imaging device comprises providing a test patch comprising a plurality of halftone cells having halftone period, scanning the test patch to obtain predetermined values for each halftone cell, calculating subset averages of the values of subsets of the halftone cells, the subsets being defined by an averaging window sized to be a multiple of the halftone period, calculating an overall average of the subset averages for the test patch and calibrating the imaging device based on the overall average.

In another aspect of the presently described embodiments, the method further comprises discarding subset averages outside a predetermined range before calculating the overall average. In another aspect of the presently described embodiments, the range is from the fifth ($5^{th}$) to the ninety-fifth ($95^{th}$) percentile of all subset averages.

In another aspect of the presently described embodiments, an image processing method applicable to scanned patches, comprises calculating averages of subsets of pixels of at least one patch, the subsets being defined by an averaging window sized to be a multiple of a halftone period, and, calculating an overall average of the averages of subsets.

In another aspect of the presently described embodiments, the method further comprises discarding subset averages.

In another aspect of the presently described embodiments, the discarded subset averages are outside the range of the mean plus or minus two standard deviations.

In another aspect of the presently described embodiments, the discarded subset averages are outside a percentile range of all the subset averages.

In another aspect of the presently described embodiments, an image processing method applicable to scanned patches, comprises calculating first averages of subsets of pixels of at least one patch, the subsets being defined by an averaging window sized to be a multiple of a first halftone period, calculating second averages of subsets of the first averages, the subsets of the first averages being defined by an averaging window sized to be a multiple of a second halftone period, and, calculating an overall average.

In another aspect of the presently described embodiments, the method further comprises discarding subset averages.

In another aspect of the presently described embodiments, the discarded subset averages are outside the range of the mean plus or minus two standard deviation.

In another aspect of the presently described embodiments, the discarded subset averages are outside a percentile range of all the subset averages.

DETAILED DESCRIPTION

Figure 1:
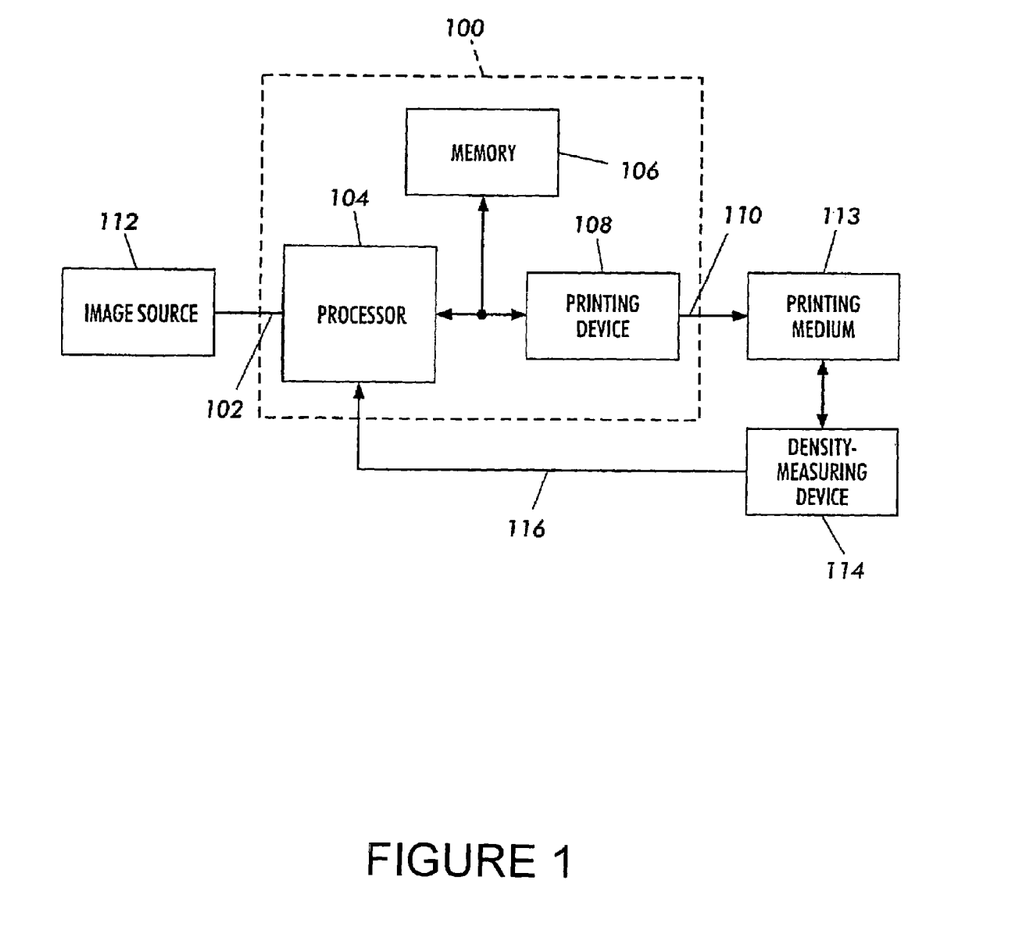
FIG. 1 is a block diagram of a system into which the presently described embodiments may be implemented.

FIG. 1 shows a system that prints test patches, measures color output values of the test patches, and calibrates the color output characteristics of the system based upon the measured color output values. The system includes an arrangement 100 according to the presently described embodiments, an image source 112, a print medium 113, and a color-measuring device 114.

The arrangement 100 includes an input 102, a processor 104, a memory 106, a printing device 108, and an output 110. In general, the arrangement receives at the input 102 an image and generates at the output 110 printed pages of recording media from which the image may be physically reconstructed.

The image source 112 can be any suitable device that generates image data corresponding to a two-dimensional image. The image source 112 is further configured to provide image data corresponding to an array of rows and columns of test patches that are used to calibrate the arrangement 100, as will be discussed in more detail below. To this end, the image source 112 can be a general purpose computer that generates printable output data, such as that generated using charting software, presentation software, computer-aided design software, and the like. In other words, the data can be generated as a software output file. Alternatively, the image source 112 can be in the form of a processor that can be found, for example, in a color copier. Such a processor can be either separate from or integral with the processor 104. It will be appreciated that the image source 112 can in some cases be a software routine that is performed by the processor 104. For example, the software routine can output a sequence of colors and input color values with which test patches are to be produced by the printing device 108. However, typically, the image source 112 will be a separate device that may or may not include other processors. The image source can possibly provide the image data in any color space, including CMYK, RGB, CIELAB, etc.

Referring now to the arrangement 100 according to the presently described embodiments, the processor 104 is a controller, microprocessor, microcontroller, programmable digital logic circuit, or other processing device, that is operable to, among other things, generate color input values in CMYK color space that correspond to the image data received from the image source 112. In most cases, the CMYK color input values will be generated by the processor 104 with the intent of causing the printing device 108 to produce an output 110 that is an accurate visual manifestation of the image data that is contained in the input 102.

The printing device 108 is a device that is operable to print the image information from the processor 104 and/or the memory 106 onto a recording medium or print medium. To this end, the printing device 108 may be an ink jet printer, a laser printer, a xerographic printing device, or other printing device that is operable to print to a recording medium based on pixel data in scan line or raster format. The printing device 108 typically uses marking agents, such as ink or toner, which can be available in four colors, such as cyan, magenta, yellow and black.

In order that the printing device 108 can achieve the many shades of color in the input color values with only the four colors of marking agents at its disposal, the processor 104 may transform the input color values into halftoned pixel data, as is well known in the art. Accordingly, the processor 104 in this embodiment is operable to translate the CMYK input color values calculated by the processor into halftone pixel data that can be stored in the memory 106. The processor 104 is also operable to coordinate the transfer of the halftone pixel data from the memory 106 to the printing device 108. To this end, it will be appreciated that the processor 104 as depicted herein can include one device or several devices that perform the various processing steps described above.

The color-measuring device 114 receives the output of the printing device 108 that is printed on a print medium 113, such as paper. In accordance with one of the presently described embodiments, the device is a color-measuring device 114 in the form of a light sensor that measures the color output values of an array of rows and columns of test patches that are printed on one or more sheets of paper by the printing device 108. The color-measuring device 114 generally emits light onto each of the test patches and measures an amount of light that is reflected off of the patch and back to the color-measuring device. The darker the test patch, the less light that is reflected back to the color-measuring device 114. The color-measuring device 114 transmits a signal 116 to the processor 104. The signal 116 indicates the output color values measured for each of the test patches. The color-measuring device 114 can include a light-emitting diode (LED) to emit light onto the patches, and a photosensitive diode to sense the amount of light being reflected off of the patches. If in the form of a scanner, the color-measuring device 114 can contain document illumination lamps, optics, a mechanical scanning drive, and a charge coupled device (CCD) array.

Although the color-measuring device can be attached to the arrangement 100, it is more typical for the color-measuring device 114 to be separate from the arrangement 100. More particularly, the color-measuring device 114 can be provided in the factory where the imaging device 100 is manufactured.

In this case, the color-measuring device 114 can be used to calibrate the output of the imaging device 100 before the imaging device 100 leaves the factory. Alternatively, or additionally, the color-measuring device 114 can be provided at the facility where the imaging device 100 operates in order to occasionally calibrate the output of the imaging device 100 over the course of its useful life.

Figure 2:
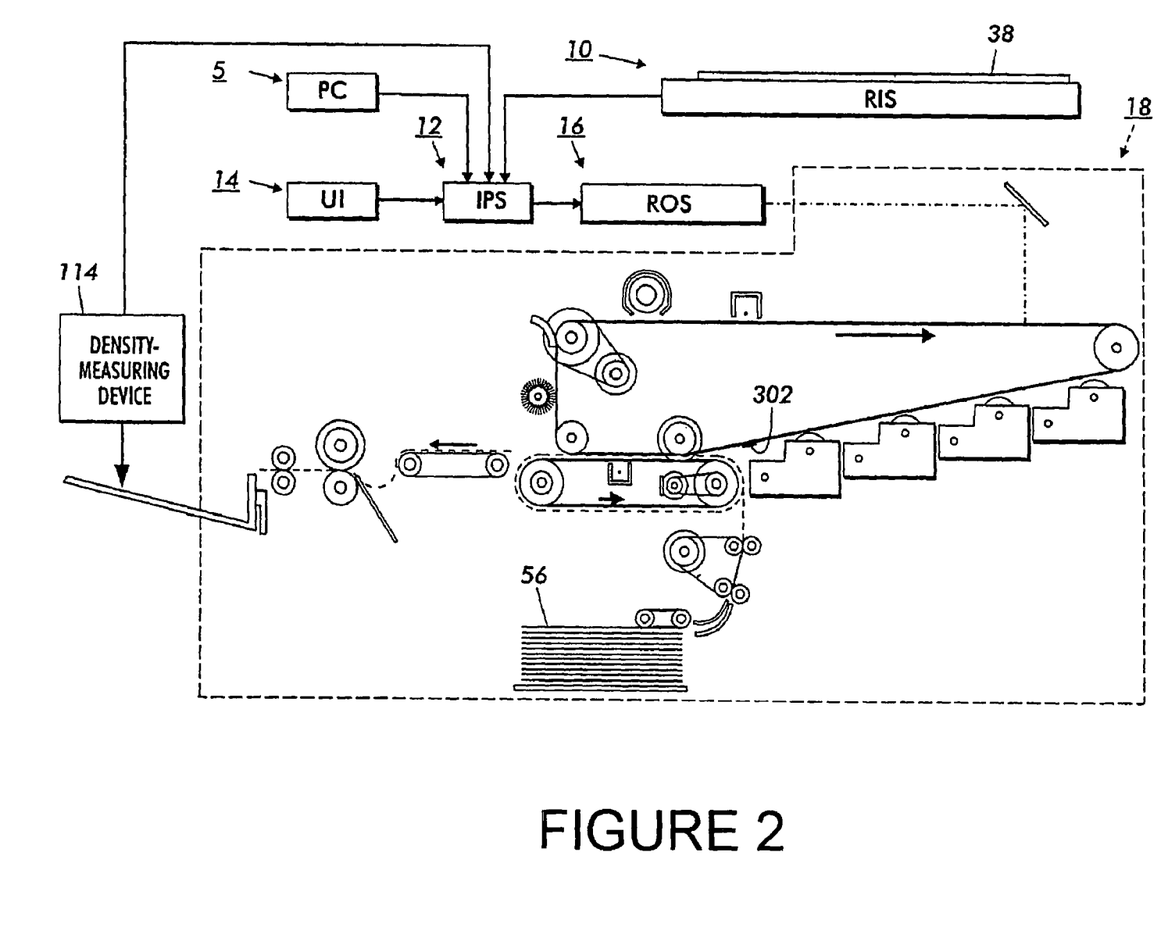
FIG. 2 is a more detailed representation of a system such as that of FIG. 1.

FIG. 2 shows an illustrative embodiment of a printing machine that incorporates aspects of the presently described embodiments. FIG. 2 is a schematic elevational view showing an illustrative electrophotographic printing machine and a networked PC which may incorporate features of the presently described embodiments therein. As discussed above, however, it will become evident from the following discussion that the presently described embodiments are equally well suited for use in a wide variety of printing and copying systems, and therefore are not limited in application to the particular system(s) shown and described herein.

The illustrative electrophotographic printing machine of FIG. 2 is operable to print on recording media images that are generated when an input manuscript is scanned. To begin by way of general explanation of the machine of FIG. 2, an image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with the IPS 12. A user interface (UI), indicated generally by the reference numeral 14, is also in communication with the IPS 12.

The UI 14 enables an operator to control and monitor various operator-adjustable functions and maintenance activities. The operator actuates the appropriate keys of the UI 14 to adjust the parameters of the copy. The UI 14 may be a touch screen, or any other suitable control panel, providing an operator interface with the system. The output signal from the UI 14 is transmitted to the IPS 12. The UI 14 may also display electronic documents on a display screen (not shown in FIG. 2).

Digitized electronic documents may be created, modified, stored and/or otherwise processed by the PC 5 prior to transmission/relay to the IPS 12 for printing on a printer or marking engine, indicated generally by the reference numeral 18. The display of the PC 5 may show electronic documents on a screen (not shown in FIG. 2). In the embodiment described herein, the IPS 12 includes the processor(s), controller(s), and/or other circuits (not shown in FIG. 2) required to perform the operations ascribed to the processor 104 of FIG. 2. Nevertheless, in an alternative embodiment, the operations of the processor 104 of FIG. 1 may be carried out within the PC 5.

The IPS 12 also transmits signals corresponding to the desired electronic or scanned image to the marking element, which creates the output copy image, using methods not material to the presently described embodiments. The marking element causes more or less of the various colorants (ink or toner) to be deposited on and/or affixed to the paper according to the strengths of the signals it receives.

Typically, in color printing, there are four signals, one for each of yellow, magenta, cyan and black. There might, however, be more signals, in a system having more than four colorants. Each of the signals controls how much of a corresponding colorant is deposited on the paper. The amount of the corresponding colorant controls how much light is reflected and how much is absorbed in part of the spectrum. For example, the amount of yellow colorant controls how much blue light is reflected, because yellow colorant has a yellow appearance due to absorbing blue and reflecting other colors. To produce a green appearance, yellow and cyan colorants are used in combination to absorb both blue and red, leaving only light in the green portion of the spectrum.

Figure 3:
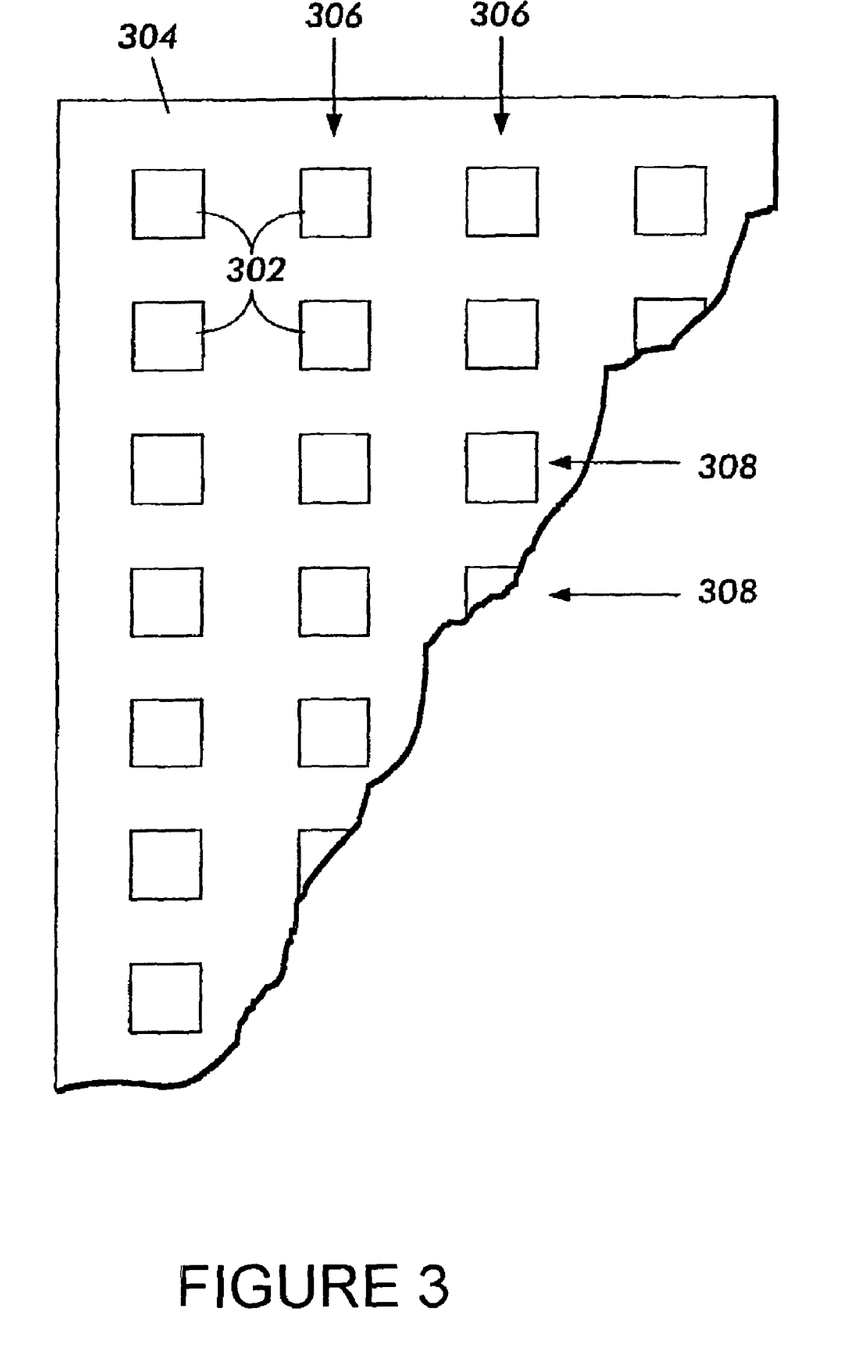
FIG. 3 is a fragmentary plan view of an array of illustrative patches printed by a system of FIGS. 1 or 2.
Figure 4:
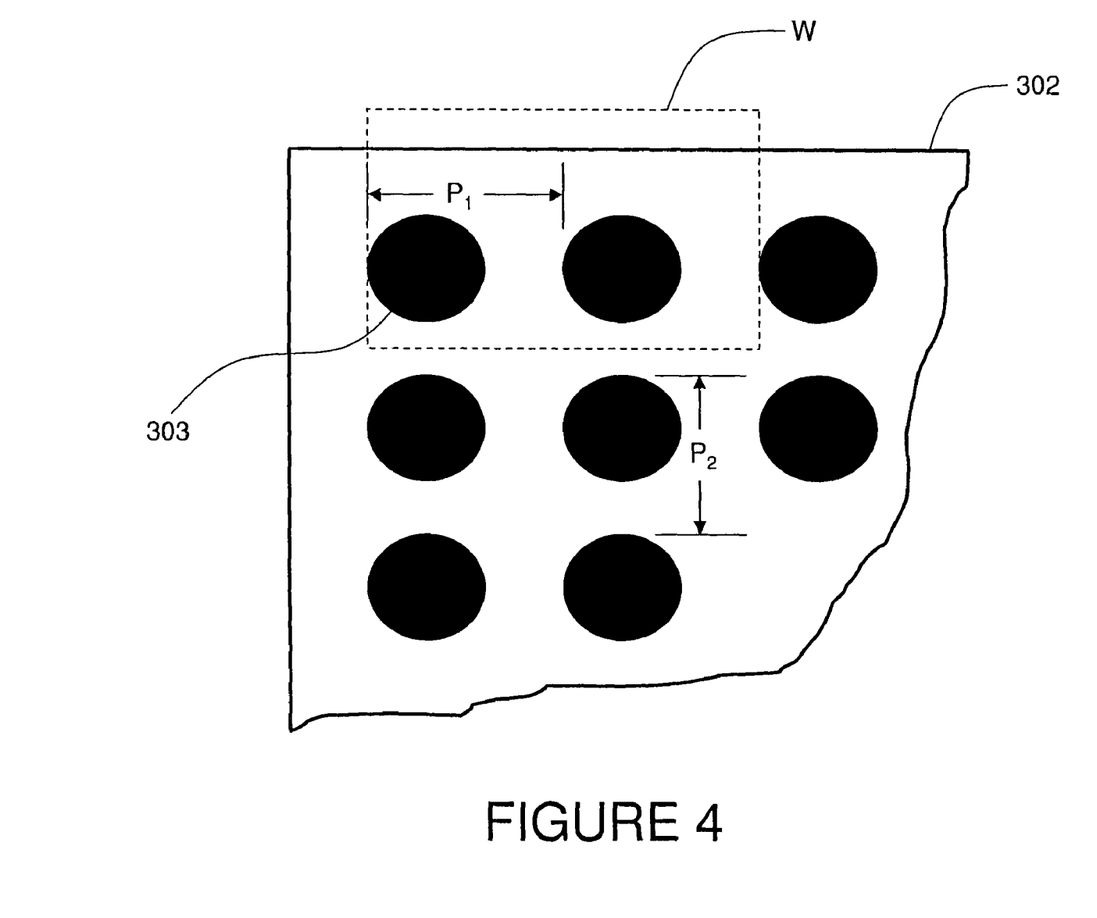
FIG. 4 shows a portion of a test patch.

With reference to FIG. 3, the printer 18 (or printing device 108) produces an array of test patches, such as patches 302, on a sheet 56. The test patches 302 on the sheet 56 can include (unintentional) streaks, and other possible print defects. The color-measuring device or scanner 114 measures the density of the test patches 302. The color-measuring device 114 transmits the measurement data to the IPS 12. The IPS 12 then uses the measurement data to conduct calculations based on a calibration method that may be used. Note that each of the patches 302 has a halftone period, respectively, in each of the directions 306 and 308. This is illustrated in FIG. 4 wherein a portion of the example test patch 302 is shown. The printed dots or pixels, such as 303, have a period P1 in a horizontal direction and a period P2 in a vertical direction. P1 and P2 may be the same or different. A window W covering two (2) halftone periods is shown.

As alluded to above, the functions performed in typical scanner-based printer calibration are to 1) characterize the scanner using prints from the same or a similar printer, and 2) then calibrate the printer using the scanner. The first function involves measuring the print with a spectrophotometer to establish a baseline, scanning the print, and conducting image processing on the scan to obtain a scanner equivalent set of values, and forming a mapping from scanned values to the baseline. The second function typically requires the same set of image processing techniques to obtain scanned values for the printer in its then-current state.

According to the presently described embodiments, however, the image processing performed on the scanned values also includes 1) converting pixel values to reflectance space; 2) identifying outliers from the set of pixel values corresponding to individual patches; and 3) computing patch averages with the outliers removed. In this regard, it should be understood that the presently described embodiments may, where appropriate, be implemented in software routines, and suitable hardware configurations, to perform the functions described herein by the elements described. Of course, software routines may be distributed among the elements (e.g. a scanner, a processor, an imaging processing station, a PC, . . . etc.) or, if suitable, may be centralized in a convenient location. For example, in one form, software routines implementing the presently described embodiments may be implemented in the image processing station (IPS) 12 of FIG. 2, or the processor 104 of FIG. 1.

Current CCD scanners appear to have linear response. As a result, those of skill in the art will understand that the first function (e.g. converting pixel values) is simply a matter of a scale and shift.

In regard to finding the appropriate shift and scale parameters, spectrophotometer values measured from a black to white sweep give a correspondence from known points in CMYK space to L*a*b* values (with most of the information contained in L*). Ignoring the channels other than L*, one may compute the reflectance for each of these patches using the formula $$R = \begin{cases} \left(\dfrac{L^* + 16}{116}\right)^3, & L^* > 16 \\ \left(\dfrac{32}{116}\right)^3 \dfrac{L^*}{16}, & L^* \le 16 \end{cases}.$$

RGB values from averaged patches also give a correspondence from CMYK to scanner RGB. Fitting the RGB values to the measured reflectances with best fit lines gives a shift and scale coefficient for each separation.

Figure 5:
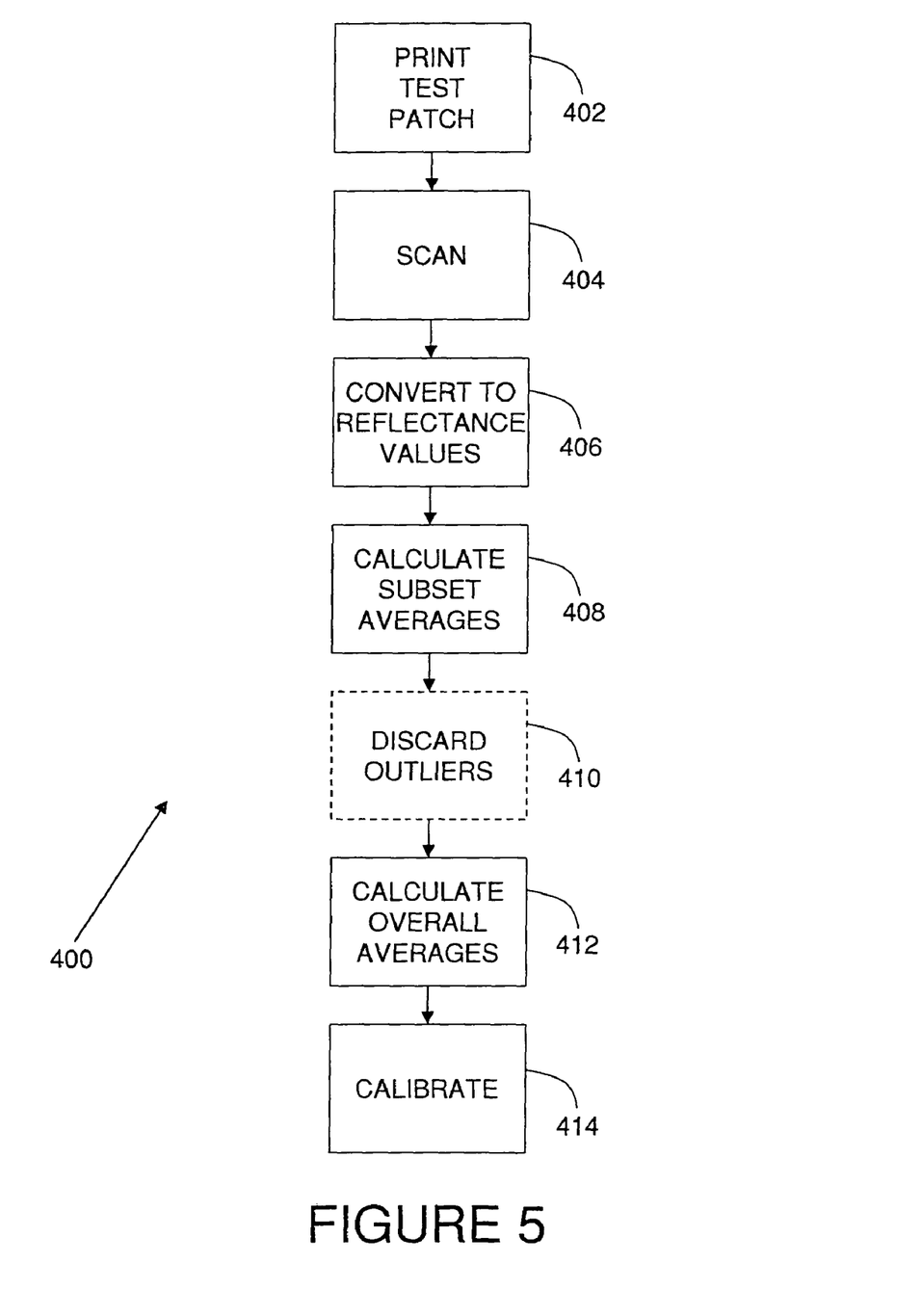
FIG. 5 is a flow chart representing an example method of the presently described embodiments; and, FIG. 6 is a graphic illustration of an example implementation according to the presently described embodiments.

With respect to the second and third functions noted above (e.g. identifying outliers and computing patch averages), their implementation will be apparent from a description of FIG. 5. In this regard, FIG. 5 shows a flow chart of an example method according to the presently described embodiments. As shown, the method 400 is initiated with the printing of a test patch (at 402). Of course, it should be appreciated that the printing of an entire test pattern may also be accomplished in order to implement a full scale calibration. The test patch and test pattern will vary from application to application.

Once the test patch is printed, it is scanned to obtain values for each halftone cell (at 404). Of course, the values may be of any type desired in the imaging field. Typically, the values relate to the amount and/or quality of the colorant deposited on the paper. For example, luminance may be measured.

Next, as noted above, the values are converted to reflectance values (at 406). Subset averages of the values of subsets of the patches are then calculated (at 408). This is typically an iterative process whereby a window is placed sequentially over subsets for which averages are calculated. It should be appreciated that the subsets are defined by an averaging window that is sized to be a multiple of the halftone period. The halftone period is a known value in either the horizontal or vertical direction. If not directly known, it can be easily determined by those of skill in the art. The multiple could be any multiple but, at least in one form, is a whole number multiple such as 1, 2, 3, . . . etc. A window W, used for averaging, having a size of two (2) halftone periods is shown, for example, in FIG. 4.

As those of skill in the art will appreciate, selection of a value for the multiple takes into account a variety of different factors. For example, CMYK halftoned images contain noise at the frequencies of the halftone dots used. Each of the four channels contributes some noise to the result; however, yellow contributes substantially less than the other two. Patches commonly used for printer calibration either contain no black or only contain black, simplifying things further. Each of the RGB channels has two contributing halftone screens. Red is affected by magenta and to some extent yellow. Green is affected by cyan and to some extent yellow. Blue is affected by magenta and cyan. All three channels are affected by black patches, but those patches are only affected by the black separation as it appears alone. The pattern of halftones for any one separation has a regular repeat frequency corresponding to a few (typically less than 10) pixels in each dimension. High addressability and supercell screens are used to increase the intensity resolution from what would be less than 100 levels to an acceptable number; however, the dominant screen frequency is generally greater than 60 lines per inch, which means that the repeat pattern is less than 10 in a 600 spi scan.

Were individual separations the entire story, it would be sufficient to average multiples of a single halftone cell. However, multiple separations are typically involved. To capture an entire repeat pattern would require averaging multiples of the least common multiple of the cell repeat patterns for all separations involved. However, this approach is not necessary. Each separation (e.g. color) can be dealt with on an individual basis.

Consider the case where cyan and magenta have repeat patterns of 7 and 9 pixels respectively. The least common multiple of these is 63. However, any sequence of 7 pixels will have the same cyan contribution (to the extent halftone noise is the only noise source). We can average groups of 7 to obtain an "image" with the cyan halftone effectively removed. These averages overlap. Another way to describe this is to apply a 7 pixel box filter to the image. It will still have noise, but not noise induced by the cyan halftone screen. Similarly, the average of any sequence of 9 pixels will have the same magenta contribution. An observation is that the average of any sequence of 9 pixels from the filtered image will have both the cyan and magenta screen frequencies removed.

Typically, for both printer calibration, and characterizing a scanner for use with a specific printer, the separations used in a given patch are known, and so the filters for only the separations used need be applied.

Simple averaging techniques are used here to calculate the subset averages of the patch. For example, one approach is to compute each pixel as the sum of all pixels under the extent of its filter and then divide by the filter size. For an n×m filter and a test patch size of N×M, this takes nm additions, plus one division per output pixel, with (N−n)(M−m) output pixels, or nm(N−n)(M−m)=O(nmNM) additions.

Another approach, the x-y separable approach, is to compute averages row-wise, and then apply the column-wise filtering to a single column. This takes nN additions and one division per row, or O(nMN) additions in total. The disadvantage of this approach is that any statistics calculated are on row-slices of the filter, rather than the entire filter.

For moderate sized filters (i.e., repeats of greater than 5 pixels), the summed area table approach is available. Here, the image is first converted to a summed area table. Each entry in the table is the sum of the corresponding pixel in the input image and all pixels to the above and left of it. This is computed by proceeding from top left to bottom right, row-wise. The first pixel is copied. The remainder of the first row is computed by adding to the pixel the entry already in the table corresponding to the pixel to its left. The remaining rows are computed by adding to each pixel the values in the table immediately above and to the left. This takes just under 2 additions per pixel in the table. To find a pixel in the filtered image, take the value in the table corresponding to the lower right corner of the filter centered on that pixel; subtract the value one filter-height above, and one filter-width to the left; add the values one filter-width left and one filter-height above. In this way, the entire image is filtered with a little under 6 additions per pixel. One more addition is required per pixel to obtain the final sum/average over the entire image. This is done after filters for all relevant separations have been applied.

If the x-y separable approach is satisfactory, the summed area table approach can be applied to the one dimensional problem. Then, the table only contains the sums of the values to the left, and it takes one addition per pixel to compute the table. An additional add and subtract give the sum for any strip width, which is faster if the repeat pattern is greater than 3. Whether separability may be assumed depends on the anticipated print defects.

Referring back now to FIG. 5, outliers may then be discarded, if desired (at 410). In this regard, subset averages that lie outside a predetermined range may be discarded before calculating the overall average. This is an optional technique in the implementation of the presently described embodiments; however, in one form, the range is from the fifth ($5^{th}$) to the ninety-fifth ($95^{th}$) percentile of all subset averages.

In order to eliminate outliers, the mean and standard deviation are calculated for each group of averages. Those averages outside of two standard deviations of the mean are removed, and the mean and standard deviation are re-calculated. This repeats until the mean no longer changes significantly.

Both the mean and standard deviation are calculated using incremental formulas from Knuth, *The Art of Computer Programming*, vol 2: Semi-Numerical Algorithms (3d Ed. 1997), which is incorporated herein by reference in its entirety. Because only a few outliers are to be removed, incremental formulas are also used to update the standard deviation and mean when the outliers are removed. This substantially saves cost in calculating statistics.

Knuth's formulae are $M_k = M_{k-1} + (x_k - M_{k-1})/k$ and $$S_k = S_{k-1} + (x_k - M_{k-1}) \cdot (x_k - M_K)$$

The mean is then $M_N$ and the standard deviation is computed as $(S_N/(N-1))^{1/2}$. The following four lines add a new term to the population.

N++;

delta=x−M;

M+=delta/N;

S+=delta*(x−M).

To subtract a term, invert the formulas $M_{k-1} = (kM_k - x_k)/(k-1)$ and $$S_{k-1} = S_k - (x_k - M_{k-1}) \cdot (x_k - M_K),$$ leading to the lines delta=x−M;

M=(N*M−x)/(N−1);

S−=delta*(x−M):

−N.

Whether or not the outliers are discarded, an overall average is then calculated (at 412). Again, simple averaging techniques are used to obtain the overall average. Multiple iterations of averaging may be conducted. So, averages of averages may be calculated, depending on the amount of data and/or nature of the specific application. An averaging window, as described above, may also be used. The imaging device that is subject to this process is then calibrated based on the calculated data (at 414). Of course, any suitable calibration technique could be used.

The method may be applied in two dimensions. The frequencies in the two dimensions are likely to differ. So, for each separation, the algorithm amounts to applying an appropriately sized box filter to the image and discarding pixels too near the edge to be covered by less than a complete filter.

Then, as described in the one dimensional case above, once the filtered pixels have been obtained, outliers may be removed, and streak/band correction (if applicable) applied. The remaining pixels are then averaged to obtain a result for the entire test patch.

Other than the non-linear operation of removing outliers, averaging the filtered pixels is equivalent to taking a weighted average of all the pixels in the original image. All pixels obtain the same weight except those around the boundary.

The method described includes methods of computing patch averages in the presence of halftone based and random noise. Pixels are corrected for non-linearity and averaged across windows that are one halftone-cell wide. Statistics are computed across windows, and outliers are removed from the ensemble, before averages from the windows are combined into a single global average over the entire patch. Coefficients of the correction are computed using a least-squares fit to minimize the difference between patch average as computed and reflectances measured by a spectrophotometer with an extended aperture. Patch values computed in this way can be used to characterize a scanner, or, once the scanner is characterized, to calibrate (or potentially characterize) a printer.

The method described above has particular application to small patches. One measure of the error incurred is the variation from window to window when various sub-patches are averaged. In an essentially uniform patch, there should be no variation between sub-patches.

Figure 6:
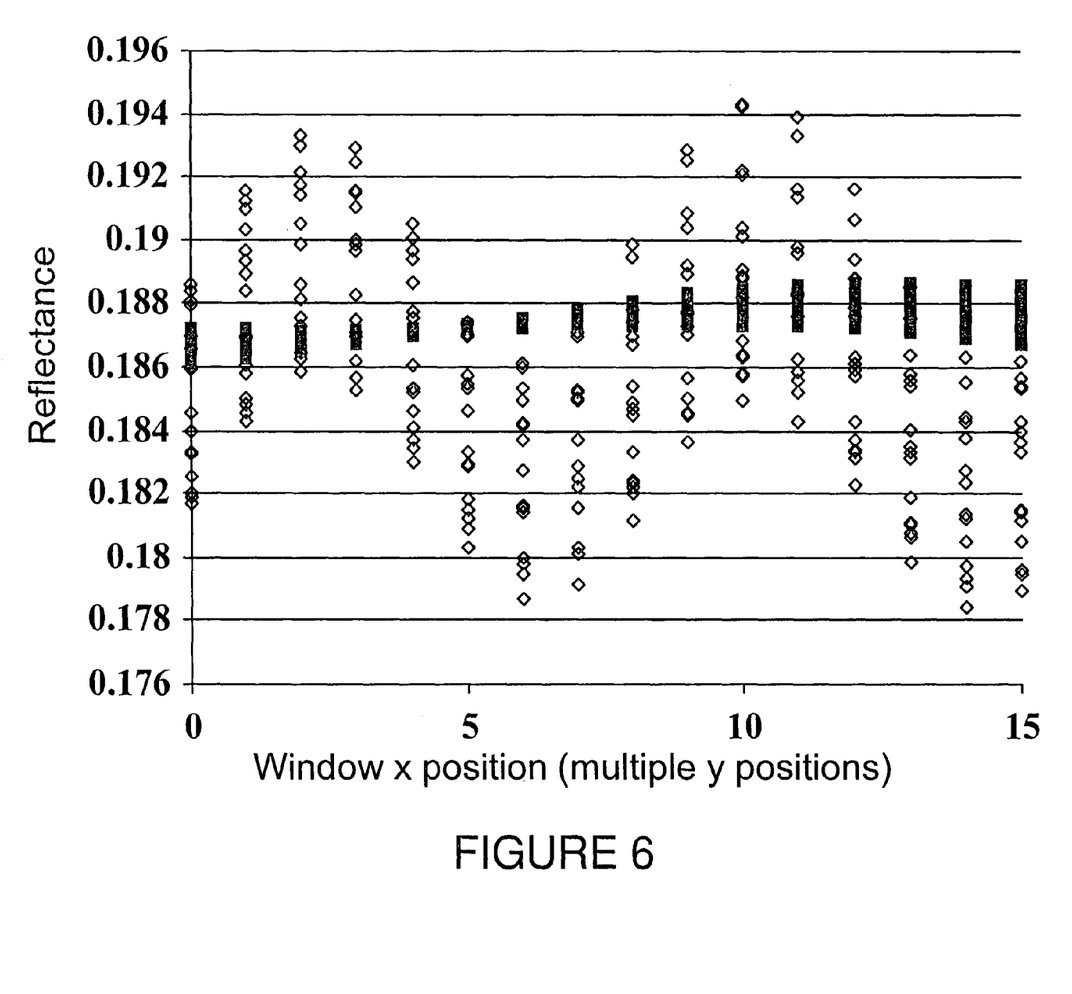

To test the method, a series of patches were scanned and averaged both using the new method and using the standard method. Results for one sample patch appear in FIG. 6. Each point represents the average over a 52×52 sub-window of the same patch; the sub-windows are offset from each other by 0 . . . 15 steps in each of X and Y. The open squares represent the normal averaging method; the filled diamonds represent the new method. The standard deviation of the averages using the simple method was 0.003596. The standard deviation of the averages using the new method was 0.000605. Thus, the new method provides a considerably more reliable method of estimating the average reflectance of a patch, when the patch size is small. The variation across the abscissa of the graph in the diamonds reflects variation across the patch itself (it is only 0.00148—less than 1% of the mean), while variation within horizontal position reflects variation in the slow scan direction of the patch (0.000521). These variations result from a combination of scanner illumination variation and printer variation.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

The claims can encompass embodiments in hardware, software, or a combination thereof.

The invention claimed is:

1. A calibration method for a printer comprising:
   printing at least one test patch comprising a plurality of halftone cells having a halftone period for printed dots of the test patch;
   scanning the test patch to obtain reflectance values for each pixel within each halftone cell;
   calculating subset averages of the values of subsets of the pixels of the halftone cells, the subsets being defined by an averaging window sized to be a whole number multiple of the halftone period for the printed dots of the test patch;
   calculating an overall average of the subset averages for the test patch; and,
   calibrating the printer based on the overall average.

2. The method as set forth in claim 1 further comprising discarding subset averages outside a predetermined range before calculating the overall average.

3. The method as set forth in claim 2 wherein the range is from the fifth ($5^{th}$) to the ninety-fifth ($95^{th}$) percentile of all subset averages.

4. The method as set forth in claim 1 wherein the plurality of halftone cells are disposed in two directions.

5. The method as set forth in claim 4 wherein the calculating of subset averages is conducted in the two directions.

6. The method as set forth in claim 1 wherein the test patch includes multiple separations.

7. The method as set forth in claim 6 wherein calculating subset averages, calculating the overall average and calibrating is conducted for each of the multiple separations.

8. The method as set forth in claim 1 wherein the at least one test patch comprises a test pattern.

9. A system comprising:
a printing device operative to print at least one test patch comprising a plurality of halftone cells having a halftone period for printed dots of the test patch;
a scanning device operative to scan the test patch to obtain predetermined values for each halftone cell; and,
a processor operative to calculate subset averages of the values of subsets of the halftone cells, the subsets being defined by an averaging window sized to be a whole number multiple of the halftone period for the printed dots of the test patch, calculate an overall average of the subset averages for the test patch and calibrate based on the overall average.

10. The system as set forth in claim 9 wherein the processor is further operative to discard subset averages outside a predetermined range before calculating the overall average.

11. The system as set forth in claim 10 wherein the range is from the fifth ($5^{th}$) to the ninety-fifth ($95^{th}$) percentile of all subset averages.

12. The system as set forth in claim 9 wherein the plurality of halftone cells are disposed in two directions.

13. The system as set forth in claim 12 wherein the processor is further operative to calculate subset averages in the two directions.

14. The system set forth in claim 9 wherein the test patch includes multiple separations.

15. The system as set forth in claim 14 wherein the processor is operative to calculate subset averages, calculate the overall average and calibrate for each of the multiple separations.

16. The system as set forth in claim 9 wherein the at least one test patch comprises a test pattern.

17. A calibration method for an imaging device:
providing a test patch comprising a plurality of halftone cells having halftone period for printed dots of the test patch;
scanning the test patch to obtain predetermined values for each halftone cell;
calculating subset averages of the values of subsets of the halftone cells, the subsets being defined by an averaging window sized to be a whole number multiple of the halftone period for the printed dots of the test patch;
calculating an overall average of the subset averages for the test patch; and,
calibrating the imaging device based on the overall average.

18. The method as set forth in claim 17 further comprising discarding subset averages outside a predetermined range before calculating the overall average.

19. The method as set forth in claim 18 wherein the range is from the fifth ($5^{th}$) to the ninety-fifth ($95^{th}$) percentile of all subset averages.

20. An image processing method applicable to scanned patches, comprising:
calculating averages of subsets of pixels of at least one patch, the subsets being defined by an averaging window sized to be a whole number multiple of a halftone period of printed dots of the patch; and,
calculating an overall average of he averages of subsets.

21. The method as set forth in claim 20 further comprising discarding subset averages.

22. The method as set forth in claim 21 wherein the discarded subset averages are outside the range of the mean plus or minus two standard deviation.

23. The method as set forth in claim 21 wherein the discarded subset averages are outside a percentile range of all the subset averages.

24. An image processing method applicable to scanned patches, comprising:
calculating first averages of subsets of pixels of at least one patch, the subsets being defined by an averaging window sized to be a whole number multiple of a first halftone period for printed dots of the patch;
calculating second averages of subsets of the first averages, the subsets of the first averages being defined by an averaging window sized to be a whole number multiple of a second halftone period; and,
calculating an overall average.

25. The method as set forth in claim 24 further comprising discarding subset averages.

26. The method as set forth in claim 25 wherein the discarded subset averages are outside the range of the mean plus or minus two standard deviation.

27. The method as set forth in claim 25 wherein the discarded subset averages are outside a percentile range of all the subset averages.

28. The method as set forth in claim 1 wherein the whole number multiple is at least two (2).

29. The method as set forth in claim 17 wherein the whole number multiple is at least two (2).

30. The method as set forth in claim 20 wherein the whole number multiple is at least two (2).

31. The method as set forth in claim 24 wherein the whole number multiple is at least two (2).

32. The system as set forth in claim 9 wherein the whole number multiple is at least two (2).

\* \* \* \* \*

UNITED STATES PATENT AND TRADEMARK OFFICE
CERTIFICATE OF CORRECTION

| | | |
|---|---|---|
| PATENT NO. | : 8,203,768 B2 | Page 1 of 1 |
| APPLICATION NO. | : 11/170975 | |
| DATED | : June 19, 2012 | |
| INVENTOR(S) | : R. Victor Klassen | |

It is certified that error appears in the above-identified patent and that said Letters Patent is hereby corrected as shown below:

Title page, (73) Assignee should read: Xerox Corporation, Norwalk, CT (US)

Signed and Sealed this
Fourteenth Day of August, 2012

David J. Kappos
*Director of the United States Patent and Trademark Office*